United States Patent [19]

Sato et al.

[11] Patent Number: 4,699,891

[45] Date of Patent: Oct. 13, 1987

[54] DIELECTRIC CERAMIC COMPOSITION

[75] Inventors: Hosaku Sato; Kazutoshi Ayusawa; Minoru Saito; Matsue Nakayama, all of Tokyo, Japan

[73] Assignee: Oki Electric Industry Co., Ltd., Tokyo, Japan

[21] Appl. No.: 883,018

[22] Filed: Jul. 7, 1986

Related U.S. Application Data

[63] Continuation-in-part of Ser. No. 821,915, Jan. 23, 1986, abandoned.

[30] Foreign Application Priority Data

Jan. 28, 1985 [JP] Japan ................... 60-13738

[51] Int. Cl.[4] ................ C04B 35/46; C04B 35/50
[52] U.S. Cl. ..................... 501/139; 501/137
[58] Field of Search ................. 501/134–139

[56] References Cited

U.S. PATENT DOCUMENTS

| 4,461,844 | 7/1984 | Itakura et al. | 501/137 |
| 4,550,089 | 10/1985 | Ayusawa et al. | 501/139 |

FOREIGN PATENT DOCUMENTS

| 564258 | 10/1958 | Canada | 501/137 |
| 45-10308 | 4/1970 | Japan | 501/137 |
| 50-76112 | 6/1975 | Japan | 501/138 |
| 57-40805 | 3/1982 | Japan | 501/139 |
| 57-174806 | 10/1982 | Japan | 501/139 |
| 57-180007 | 11/1982 | Japan | 501/136 |
| 789084 | 1/1958 | United Kingdom | 501/136 |

Primary Examiner—William R. Dixon, Jr.
Assistant Examiner—A. Knab
Attorney, Agent, or Firm—Wenderoth, Lind & Ponack

[57] ABSTRACT

A dielectric ceramic composition for microwave applications comprises a mixture represented by the general formula:

$$xBaO - yTiO_2 - z\{(Sm_2O_3)_{100-(w_1+w_2)}(CeO_2)_{w_1}(La_2O_3)_{w_2}\}$$

wherein x, y, z, $w_1$ and $w_2$ are mole % of respective components, $6 \leq x \leq 22$, $59 \leq y \leq 79.5$, $2 \leq z \leq 34.5$, $x+y+z=100$, and $0 < (w_1+w_2) \leq 95$, and wherein both $w_1$ and $w_2$ are exclusive of zero.

Further this composition may include $MnO_2$ as another component of which the amount is 4 weight % and less on the basis of total weight of BaO, $TiO_2$, $Sm_2O_3$, $CeO_2$ and $La_2O_3$.

Since this composition has a high specific dielectric constant $\epsilon r$, a high no load value Q and a positive or negative temperature coefficient $\eta f$ of about zero, it can be used as a microwave dielectric resonator, a temperature compensating capacitor or the like.

2 Claims, No Drawings

DIELECTRIC CERAMIC COMPOSITION

This application is a continuation-in-part of now abandoned application Ser. No. 821,915, filed Jan. 23, 1986, abandoned.

BACKGROUND OF THE INVENTION

1. Field of the Invention

This invention relates to a dielectric ceramic composition for use in making microwave devices, and more particularly to a microwave dielectric ceramic composition which exhibits a high specific dielectric constant εr and a high no load value Q, and, in addition, a positive or negative temperature coefficient τf of about zero can be obtained by changing the compositional ratio.

2. Related Art of the Invention

A dielectric ceramic composition utilized for ceramic capacitors for use in temperature compensation, as well as dielectric resonators for use in microwave circuits or the like has been required to have a high specific dielectric constant εr as well as a high no load value Q, and further should obtain a positive or negative temperature coefficient τf of the resonance frequency of about zero. As such a dielectric ceramic composition, a BaO—TiO$_2$ type, a MgO—TiO$_2$—CaO type, and a BaO—TiO$_2$—Sm$_2$O$_3$—La$_2$O$_3$ type and the like have heretofore been employed. A dielectric ceramic composition of the BaO—TiO$_2$—Sm$_2$O$_3$—La$_2$O$_3$ type is disclosed in Japanese unexamined patent publication No. 57-18007. The dielectric ceramic composition of the BaO—TiO$_2$—Sm$_2$O$_3$—La$_2$O$_3$ type has a characteristics of a specific dielelctric constant εr of 80 to 92, a no load value Q of 2000 to 2700 and a temperature coefficient τf of the resonance frequency of +100 to −100 ppm/°C. However, when a dielectric resonator or a capacitor is fabricated with these ceramic compositions, their specific dielectric constant εr or no load value Q becomes a low value in the vicinity where its temperature coefficient τf is zero (ppm/°C.). Consequently, the size of a such device as dielectric resonators and the like fabricated with these materials becomes too large.

SUMMARY OF THE INVENTION

It is therefore an primary object of this invention to provide an improved dielectric ceramic composition for use in microwave circuits capable of manifesting a positive or negative temperature coefficient τf of about zero, and a high specific dielectric constant εr and a high no load value Q respectively near zero (ppm/°C.) of the temperature coefficient τf.

According to this invention there is provided a dielectric ceramic composition for use in microwave circuits, comprising a mixture represented by the general formula:

xBaO—yTiO$_2$—z{(Sm$_2$O$_3$)$_{100-(w_1+w_2)}$(CeO$_2$)$_{w_1}$(La$_2$O$_3$)$_{w_2}$} wherein x, y, z, w$_1$ and w$_2$ are mole % of respective components, $6 \leq x \leq 22$, $59 \leq y \leq 79.5$, $2 \leq z \leq 34.5$, $x+y+z=100$, and $0<(w_1+w_2) \leq 95$, and wherein both w$_1$ and w$_2$ are exclusive of zero. Further this composition may include MnO$_2$ as another component of which the amount is 4 weight % and less on the basis of total weight of BaO, TiO$_2$, Sm$_2$O$_3$, CeO$_2$ and La$_2$O$_3$.

PREFERRED EMBODIMENTS OF THE INVENTION

Preferred embodiments of the invention will be described as follows.

As starting materials, high purity BaCO$_3$, TiO$_2$, Sm$_2$O$_3$, CeO$_2$ and La$_2$O$_3$ were weighed out in accordance with the predetermined compositional ratios shown in the following Table 1 and were mixed together with pure water in a rubber lined ball mill. The mixture was dehydrated, dried, and then calcined at 1000° C. for 2 hours in air. The calcined product thus obtained was subjected to wet pulverization together in pure water in a rubber lined ball mill. The pulverized slurry was dehydrated and dried to obtain a powder.

To the powder was added a binder to obtain a granulated product, which was classified by passing the product through a 32 mesh sieve. The granulated product was molded into a circular disc having a diameter of 16 mm and a thickness of 9 mm by means of metal mold and an oil press under a molding pressure of 1–3 tons/cm$^2$. The molded product was placed in a casing made of high purity alumina, and fired at a temperature of 1200°–1350° C. for 2 hours to produce a dielectric ceramic composition. The specific dielectric constant and no load value Q of the resulting dielectric ceramic composition was measured in accordance with the Hakki—Coleman method. Furthermore the temperature coefficient τf of the resonance frequency was determined from the values in the temperature range of −40° C. to +80° C. on the basis of the resonance frequency at 20° C. according to the following equation (1):

$$\tau_f = \frac{f(80) - f(-40)}{f(20)} \cdot \frac{1}{\Delta T} \text{ (ppm/°C.)} \quad (1)$$

wherein f(20): resonance frequency at 20° C.
f(−40): resonance frequency at −40° C.
f(80): resonance frequency at 80° C., and
ΔT: temperature difference, i.e. 80−(−40)=120° C. in this case.

In the above measurement, the resonance frequency was 2–4 GHz. The results of the experiment are summarized in Table 1.

This dielectric ceramic composition comprises a mixture represented by the general formula:

TABLE 1

| Example No. | Composition (Mole %) | | | | | εr | Q | τf (ppm/°C.) |
|---|---|---|---|---|---|---|---|---|
| | x | y | z | w$_1$ | w$_2$ | | | |
| 1* | 16.5 | 65.6 | 18.1 | 0 | 0 | 63 | 2025 | −255 |
| 2 | 16.5 | 65.6 | 18.1 | 2.7 | 1.4 | 65 | 1755 | −68 |
| 3 | 16.5 | 65.6 | 18.1 | 5.6 | 3.2 | 70 | 2025 | −46 |
| 4 | 16.5 | 65.6 | 18.1 | 10.1 | 5.1 | 78 | 2200 | −29 |
| 5 | 16.5 | 65.6 | 18.1 | 16.0 | 7.5 | 75 | 2310 | −1 |
| 6 | 16.5 | 65.6 | 18.1 | 45.1 | 28.6 | 69 | 2350 | +19 |
| 7 | 16.5 | 65.6 | 18.1 | 64.2 | 30.8 | 61 | 2500 | +63 |
| 8* | 16.5 | 65.6 | 18.1 | 67.6 | 32.4 | 60 | 3150 | +157 |
| 9* | 22 | 59 | 19 | 0 | 0 | 51 | 515 | −251 |
| 10 | 22 | 59 | 19 | 1.5 | 1.2 | 55 | 710 | −177 |
| 11 | 22 | 59 | 19 | 27.9 | 28.1 | 56 | 805 | +52 |
| 12 | 22 | 59 | 19 | 51.1 | 43.9 | 57 | 760 | +88 |
| 13* | 18.5 | 79.5 | 2.0 | 0 | 0 | 48 | 690 | −214 |
| 14 | 18.5 | 79.5 | 2.0 | 11 | 32 | 52 | 820 | −153 |
| 15 | 18.5 | 79.5 | 2.0 | 25 | 33 | 56 | 650 | +67 |
| 16 | 18.5 | 79.5 | 2.0 | 41 | 54 | 59 | 580 | +79 |
| 17* | 6.0 | 59.5 | 34.5 | 0 | 0 | 36 | 330 | −208 |
| 18 | 6.0 | 59.5 | 34.5 | 11.9 | 6.0 | 41 | 420 | −37 |
| 19 | 6.0 | 59.5 | 34.5 | 27.0 | 19 | 42 | 490 | +24 |

TABLE 1-continued

| Example No. | Composition (Mole %) | | | | | $\epsilon r$ | Q | $\eta f$ (ppm/°C.) |
|---|---|---|---|---|---|---|---|---|
| | x | y | z | $w_1$ | $w_2$ | | | |
| 20 | 6.0 | 59.5 | 34.5 | 42.0 | 53 | 44 | 470 | +63 |

*Control example

In the Table 1, the examples marked with * are control examples out of the scope of this invention, and the other examples are examples which are in the scope of this invention.

According to the results shown in the above Table 1, it is found that there are such problems that the temperature coefficient $\eta f$ of the resonance frequency becomes high and that the no load value Q becomes low, when the amount x of BaO exceeds 22 mole %, the amount y of $TiO_2$ is less than 59 mole %, or the total amount z of $Sm_2O_3$, $CeO_2$ and $La_2O_3$ is less than 2 mole %.

Further, the no load value Q becomes low and unmeasurable, when the amount x of BaO is less than 6 mole %, the amount Y of $TiO_2$ exceeds 79.5 mole %, or the total amount z of $Sm_2O_3$, $CeO_2$ and $La_2O_3$ exceeds 34.5 mole %. Still further, when the amount $(w_1+w_2)$ of $CeO_2$ and $La_2O_3$ exceed 95 mole % on the basis of total amount of $Sm_2O_3$, $CeO_2$ and $La_2O_3$, the temperature coefficient $\eta f$ of the resonance frequency becomes too high.

Thus, such a range shown as follows is suitable as a dielectric ceramic composition from a practical point of view in the following general formula (2):

$$xBaO-yTiO_2-z\{(Sm_2O_3)_{100-(w_1+w_2)}(CeO_2)_{w_1}(La_2O_3)_{w_2}\} \quad (2)$$

wherein
$6 \leq x \leq 22$ (mole %),
$59 \leq y \leq 79.5$ (mole %),
$2 \leq z \leq 34.5$ (mole %),
$0 < (w_1+w_2) \leq 95$ (mole %), and
wherein $(x+y+z)$ become 100, and both $w_1$ and $w_2$ are exclusive of zero.

Now another embodiment will be described as follows. The procedures of the former embodiment is repeated in the same manner except that $MnO_2$ as another starting material is added to the above mentioned starting materials composed of $BaCO_3$, $TiO_2$, $Sm_2O_3$, $CeO_2$ and $La_2O_3$.

The predetermined compositional ratios and the results of another embodiment are shown in the following Table 2.

TABLE 2

| Example No. | Composition (mole %) | | | | | $MnO_2$ (weight %) | $\epsilon r$ | Q | $\eta f$ (ppm/°C.) |
|---|---|---|---|---|---|---|---|---|---|
| | x | y | z | $w_1$ | $w_2$ | | | | |
| 21* | 17.5 | 69.0 | 13.5 | 17.5 | 11.1 | 0 | 63 | 2000 | −113 |
| 22 | 17.5 | 69.0 | 13.5 | 17.5 | 11.1 | 0.17 | 64 | 2940 | −55 |
| 23 | 17.5 | 69.0 | 13.5 | 17.5 | 11.1 | 0.77 | 67 | 2860 | −25 |
| 24 | 17.5 | 69.0 | 13.5 | 17.5 | 11.1 | 1.75 | 65 | 2750 | +5 |
| 25 | 17.5 | 69.0 | 13.5 | 17.5 | 11.1 | 2.4 | 68 | 2350 | +19 |
| 26 | 17.5 | 69.0 | 13.5 | 17.5 | 11.1 | 4 | 65 | 2100 | +57 |
| 27* | 17.5 | 69.0 | 13.5 | 17.5 | 11.1 | 5 | 62 | 990 | +199 |

*Control example

In the Table 2, a weight % of $MnO_2$ is weighed on the basis of total weight of BaO, $TiO_2$, $Sm_2O_3$, $CeO_2$ and $La_2O_3$. Further, the examples marked with * are control examples out of the scope of this invention, and the other examples are examples which are in the scope of this invention. According to the Table 2, it is found that the no load value Q becomes high, and that the temperature coefficient $\eta f$ of the resonance frequency can be changed, by addition of $MnO_2$.

However, it is found that there are such problems that the specific dielectric constant $\epsilon r$ becomes low and that the no load value Q becomes low, when the amount of $MnO_2$ exceeds 4 weight % on the basis of total weight of BaO, $TiO_2$, $Sm_2O_3$, $CeO_2$ and $La_2O_3$.

Thus, it is suitable that the amount of $MnO_2$ does not exceed 4 weight % on the basis of total weight of BaO, $TiO_2$, $Sm_2O_3$, $CeO_2$ and $La_2O_3$.

By the way, each range of mole % of BaO, $TiO_3$, $Sm_2O_3$, $CeO_2$ and $La_2O_3$ is the same as described in the former embodiment.

As is apparent from the description given above, the dielectric ceramic composition according to this invention exhibits a high specific dielectric constant $\epsilon r$ and a high no load value Q near zero (ppm/°C.) of the temparature coefficient $\eta f$ in the microwave region.

Furthermore, the temperature coefficient $\eta f$ of the dielectric ceramic composition can be low as a positive or negative value of about zero, and also controlled so as to cover a wide range by changing its compositional ratio.

Thus, the dielectric ceramic composition of this invention can be efficiently utlized to miniaturize microwave dielectric resonators, capacitors for temperature compensation or the like so that the industrial usefulness of the dielectric ceramic composition in accordance with the present inventron is remarkably high. While we have described certain present preferred embodiments of the invention it is to be distinctly understood that the invention is not limited thereto but may be otherwise variously embodied within the scope of the following claims.

What is claimed is:

1. A dielectric ceramic composition for microwave applications consisting essentially of a mixture represented by the general formula:

$$xBaO-yTiO_2-z\{(Sm_2O_3)_{100-(w_1+w_2)}(CeO_2)_{w_1}(La_2O_3)_{w_2}\}$$

wherein x, y, z, $w_1$ and $w_2$ are mole % of respective components, $6 \leq x \leq 22$, $59 \leq y \leq 79.5$, $2 \leq z \leq 34.5$, $x+y+z=100$, and $0<(w_1+w_2)\leq 95$, and wherein both $w_1$ and $w_2$ are exclusive of zero.

2. A dielectric ceramic composition according to claim 1, which further includes $MnO_2$ as another component, wherein the amount of $MnO_2$ is 4 weight % or less on the basis of the total weight of BaO, $TiO_2$, $Sm_2O_3$, $CeO_2$ and $La_2O_3$.

* * * * *